United States Patent Office 3,493,831
Patented Feb. 3, 1970

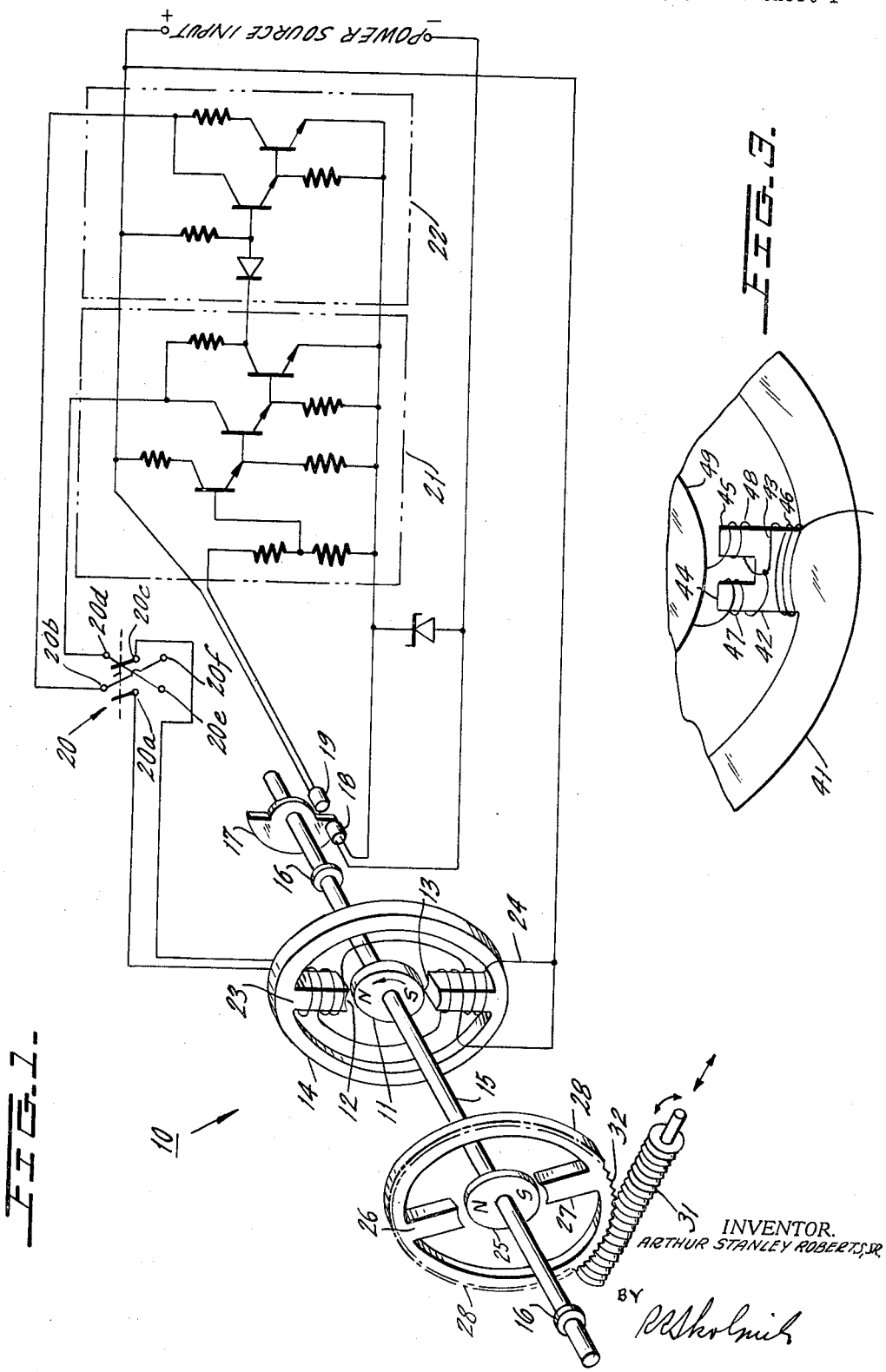

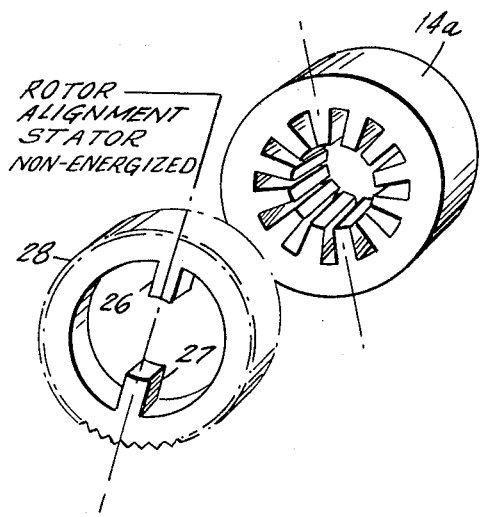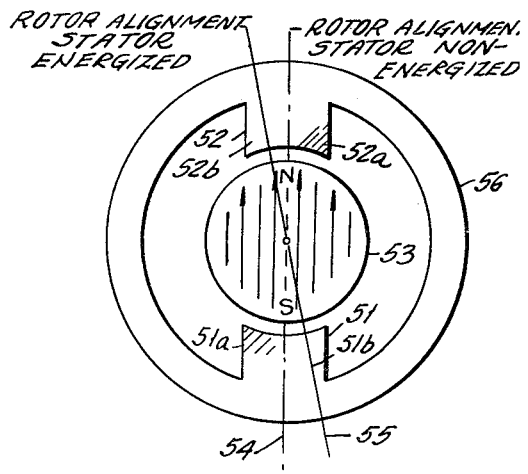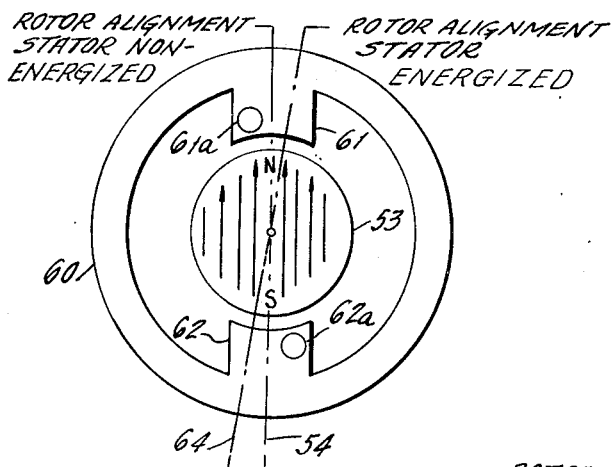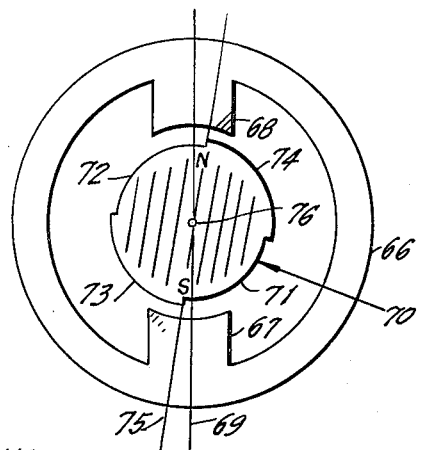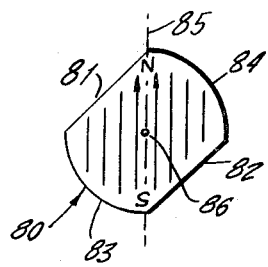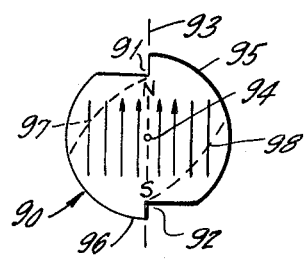

3,493,831
BRUSHLESS D.C. MOTOR INCLUDING STARTING MEANS
Arthur Stanley Roberts, Sr., Bluff City, Tenn., assignor to Sperry Rand Corporation, Sperry Farragut Company Division, Bristol, Tenn., a corporation of Delaware
Filed May 1, 1967, Ser. No. 635,098
Int. Cl. H02p 1/00
U.S. Cl. 318—138                 4 Claims

ABSTRACT OF THE DISCLOSURE

Means are described for making single sensor brushless D.C. motors self-starting by providing magnetic reluctance means to position the permanent magnet rotor so that with the rotor stopped its axis of magnetization is angularly offset from the axis of the magnetic field established when the stator winding is energized. In one embodiment the reluctance rotor positioning means is a member that is angularly adjustable with respect to the stator poles so that direction of motor rotation may be reversed without sacrificing starting torque. Another embodiment utilizes selectively auxiliary windings nonsymmetrically disposed with respect to the stator poles to achieve reversing operation without sacrificing starting torque. In other embodiments misalignment between the magnetic reluctance and electromagnetic flux field axes is achieved by altering the characteristics of a conventional pole. In still other embodiments misalignment between these flux field axes is achieved by utilizing rotors of non-circular cross-section combined with particular positioning of the permanent magnet flux field axis respect to such cross-section.

---

This invention relates to brushless D.C. motors in general and more particularly relates to novel means whereby basic motors of this type are rendered self-starting.

The prior art has provided a number of brushless D.C. motors incorporating control means responsive to rotor position for effecting switching of currents in the winding of a stationary armature to obtain motor operation. However, many of these motors either include a plurality of sensing elements for the control means thereby making the system complex, or such motors utilizing only a single sensing element for the control means are, for the most part, not self-starting. The motor of the instant invention includes a permanently magnetized rotor and achieves self-starting by novel constructions whereby with the motor stopped, the axis of the rotor permanent magnet field is angularly displaced with respect to the axis of the magnetic field generated by current flowing through the armature windings. Thus, when the motor is de-energized, reluctance effects preposition and hold the the rotor in one of a plurality of preferred positions so that when power is applied current flow in the stator winding causes the rotor to seek magnetic alignment at a new position. As is well known to the art, this new position must be greater than zero degrees but less than 180° from the at rest position of the rotor as measured in the direction of rotation.

It is preferred that the offset between the at rest position of the rotor and the magnetic field generated by stator current upon energization of the motor is closer to 180° than to zero degrees since the larger deviation permits the rotor to reach a relatively higher angular velocity, with greater kinetic energy, before reaching alignment with the electromagnetic field. The inherent moment of inertia of the rotor insures that torque is available to keep the rotor rotating through positions of electromagnetic alignment and allows the switching position for current through the stator winding to be less critical in relation to precise electromagnetic alignment.

The principle of the self-starting feature is that the permanent magnet rotor seeks a position of reluctance alignment with respect to the stator when the motor is de-energized. This reluctance alignment position is different than the two other positions of electromagnetic alignment which can exist when the motor is energized. In a two-pole motor these positions of electromagnetic alignment are 180 electrical degrees apart and are controlled by a sensor responsive to rotor position.

Accordingly, a primary object of the instant invention is to provide a novel construction for a brushless D.C. motor that is self-starting.

Another object is to provide a novel self-starting brushless D.C. motor that utilizes a single sensing element to detect rotor position.

Still another object is to provide a self-starting single sensor brushless D.C. motor having means to reverse direction of rotation without sacrificing starting torque.

A further object is to provide novel constructions whereby the permanent magnet rotor is in a magnetic reluctance derived position, when the motor is de-energized, that is displaced from magnetic alignment with the electromagnetic field established upon energization of the motor.

These as well as other objects of this invention will become readily apparent after reading the following description of the accompanying drawings in which:

FIGURE 1 is a schematic illustrating a brushless D.C. motor constructed in accordance with the teachings of the instant invention, and including an angularly adjustable member for establishing two position fixed and/or variable reluctance alignment of the rotor when the motor is de-energized.

FIGURE 2 is an exploded perspective showing a modified construction for the stator pole structure of FIGURE 1.

FIGURE 3 is a fragmentary end view showing a stator pole construction provided with auxiliary windings to achieve motor reversal of rotation without sacrificing torque.

FIGURES 4 and 5 are end views showing modified pole constructions for achieving self-starting for a single sensor brushless D.C. motor.

FIGURE 6, 7 and 8 are end views showing modified rotor constructions for achieving self-starting in a single sensor brushless D.C. motor.

Now referring to the figures and more particularly to FIGURE 1 which shows brushless D.C. motor 10 including permanent magnet rotor 11 disposed between the faces of inwardly projecting poles 12, 13 of magnetic frame 14. Rotor 11 is keyed to shaft 15 rotatably mounted in bearings 16, 16. Rotor 11 is a cylinder mounted with its cylindrical axis in alignment with the center of shaft 15 with the permanent magnet axis extending through the cylindrical axis and at right angles thereto. Keyed to shaft 15 at one end thereof is control member or light shield 17 interposed between lamp 18 and photo sensor 19. Control member 17 is constructed so as to be interposed between light source 18 and sensor 19 for 180° of rotation of shaft 15 and for the other 180° of rotation of shaft 15 light from source 18 impinges upon photo sensor 19 to operate the latter into its low impedance state.

In a manner well known to the art, when photo sensor 19 is illuminated solid state switch 21 is operated to its low impedance or "on" state and when sensor 19 is not illuminated switch 21 is in its high impedance or "off" state. Further, switch 21 is interlocked to solid state switch 22 so that when switch 21 is on, switch 22 is off and when switch 21 is off, switch 22 is on. The switches 21, 22 are connected to a double pole, double throw reversing switch 20 in order to control the energization of stator windings 23, 24 in accordance with rotor position. In particular, with switch 20 operated so that terminal 20a is connected to terminal 20b and terminal 20c is connected to terminal 20d, winding 23 becomes energized when switch 21 is on and winding 24 becomes energized when switch 22 is on.

Another permanent magnet 25 is keyed to shaft 15 near its other end and is positioned between the free end of magnetic members 26, 27 projecting radially inward from ring 28. For a reason to be hereinafter explained, worm 31 is in engagement with gear teeth 32 formed in the outer edge of frame 28 so that when worm 31 is rotated, the angular position of magnetic members 26, 27 is changed.

With motor 10 de-energized, rotor 25 seeks magnetic reluctance alignment with poles 26, 27 and rotor 11 seeks magnetic reluctance alignment with poles 12, 13. Therefore, shaft 15 rotates to a resultant position due to the combined torques produced by the permanent magnets of rotor members 11 and 25. Since poles 26, 27 are angularly offset with respect to poles 12, 13, the magnetic reluctance position for shaft 15 is such that the magnetic axis of rotor 11 is angularly offset in a counterclockwise direction with respect to the common axis of poles 12, 13. The magnetic field resulting from energization of either of the windings 23, 24 is aligned along the common axis for poles 12, 13. Thus, it is seen that the position of reluctance alignment for rotor 11 is angularly offset from the magnetic field generated by the current through stator windings 23, 24 upon energization of motor 10.

Since, in the reluctance alignment position shown for shaft 15 control member 17 blocks light from impinging on photo sensor 19, switch 21 is off and switch 22 is on so that with terminals 20a, 20b engaged, winding 23 is energized producing a magnetic field which coacts with the field of the permanent magnet rotor 11 to cause counterclockwise rotation of rotor 11.

With the elements of motor 10 in the positions of FIGURE 1, the axis of rotor field 11 is offset nearly 180° from the magnetic field produced by energization of stator winding 23. This is desirable for producing a higher average starting torque over the first commutation zone for developing relatively high inertial energy by the time rotor 11 has rotated to a position in magnetic alignment with the field generated by coil 23. For maximum initial starting torque, an offset angle of 90 degrees is best.

If the direction of rotation for motor 10 was to be reversed merely by operating switch so that contacts 20z, 20e were in engagement and 20c, 20f were in engagement, then on starting there would only be a small misalignment between the field of rotor 11 and the field generated by current flowing through coil 24 such that the shaft rotates only a small angle before switching takes place, thus the average torque (or torque-time product) for the first commutation zone would be appreciably reduced. In order to retain favorable starting torque characteristics when motor direction is reversed, worm 31 is rotated so as to operate frame in a clockwise direction to a position wherein the magnetic reluctance alignment of rotor 11, when motor 10 is de-energized, is at a position clockwise of the axis of the field generated by current flow through the stator windings. Thus, the positioning means for frame 28 is included to provide means whereby with the motor de-energized, the magnetic reluctance alignment of the rotor magnetic axis is selectively positionable to lead the axis of the electromagnetic field produced on energizing the motor in the direction of preferred rotation so that construction provides for clockwise or counterclockwise rotation in a single structure.

While rotors 11 and 25 are illustrated in FIGURE 1 as being axially spaced elements, these elements may be combined into a single member. Further, frames 14 and 28 may be moved axially to adjacent positions and windings 23, 24 may even encompass magnetic members 26, 27.

Further, while magnetic frame 14 of FIGURE 1 is provided with only two poles 12, 13 there is no restriction on the number of poles that the magnetic frame may contain. As the number of poles increases, the reluctance effect of the magnetic frame decreases and the effect of the other magnetic members 26, 27 becomes the dominant factor in positioning shaft 15 when the motor is de-energized.

FIGURE 2 illustrates a modified construction for the embodiment of FIGURE 1 with the stator magnetic frame 14a having twelve poles so closely positioned that the reluctance effect thereof does not contribute materially, if at all, to the position of the motor shaft when the motor is de-energized. The stator winding (not shown) for frame 14a may be the distributed winding of a two-pole machine or may be the winding of a motor having four or more poles.

In the embodiment of FIGURE 3, a single magnetic frame 41 is provided for the stator and pole piece 42 is provided with a main section 43 about which the main stator winding 46 is wound. The pole face end of each pole piece 42 is notched to provide spaced symmetrically positioned sections 44, 45 about which the respective auxiliary windings 47, 48 are wound. By means of circuitry, not shown, one or the other of auxiliary windings 47, 48 is energized to reverse the direction of rotation for rotor 49.

In the embodiment of FIGURE 3, the magnetic reluctance alignment position for rotor 49 is such that the axis of its magnetic field extend through the center of pole piece 42. However, the axis of the magnetic field generated by current flow through the stator windings is offset from the centre of pole piece 42. More particularly, the electromagnetic field is offset toward pole piece section 44 when auxiliary winding 47 is energized and is offset toward pole piece section 45 when auxiliary winding 48 is energized. This construction provides a convenient way of electrically shifting the reluctance and electromagnetic misalignments so that motor torque characteristics are not downgraded when direction of rotation is reversed.

In the embodiment of FIGURE 4, misalignment between the rotor magnetic axis, with the motor de-energized, and the axis of the electromagnetic field created upon energization of the motor, is achieved by providing pole pieces 51, 52 that do not have uniform reluctance properties throughout. That is, shaded areas 51a, 52a of poles 51, 52, respectively, are provided with different magnetic properties than the remaining portions of poles 51, 52. This difference in magnetic properties is accomplished by applying different heat treatments to different regions of poles 51, 52, or the like. More particularly, by annealing portions 51a, 52a, the magnetic properties thereof will be such that these portions 51a, 52a will be driven to, or closer to, magnetic saturation before the remaining, or main portions, 51b, 52b of the respective poles 51, 52 are driven to saturation.

Cylindrical rotor 53 is centered between the curved pole faces of poles 51, 52 with the air gaps between rotor 53 and poles 51, 52 being uniform throughout the length thereof. The stator winding (not shown) is wound directly about poles 51, 52. The flux generated by the permanent magnet field of rotor 53 is of a magnitude such that with the stator windings de-energized, the magnetic reluctance of pole piece portions 51a, 52a is substantially equal to the magnetic reluctance of main pole piece portions 51b, 52b so that the magnetic axis 54 of rotor 53 is positioned substantially centered with respect to pole pieces 51, 52. However, when the stator winding is energized, the electromagnetic flux generated combines with the permanent magnet flux of rotor 53 to saturate pole piece portions 51a, 52a and as a result the axis 55 of the electromagnetic flux field is displaced in a counter-clockwise direction from the axis 54 of the permanent magnet flux field.

It should now be apparent to those skilled in the art that the same stator winding means and solid state switching devices as illustrated in FIGURE 1 may be used with the magnetic frame 56 and permanent magnet rotor 53 to achieve motor action.

In the embodiment of FIGURE 5, pole pieces 61 62 of magnetic frames 60 have bores 61a, 62a, respectively, drilled therethrough. Bores 61a, 62a are of such sizes and are so positioned that magnetic saturation effects take place in the regions thereof when the stator winding means is energized. Thus, when the stator winding means is energized, the axis 64 of the electromagnetic field produced thereby is off centered, with respect to pole pieces 61, 62, away from the saturated areas in the vicinity of bores 61a, 62a. However, with the motor de-energized, axis 54 of the permanent magnet rotor field assumes a position substantially centered with respect to poles 61, 62.

In the embodiment of FIGURE 6, pole pieces 67, 68 of magnetic frame 66 have uniform magnetic characteristics throughout so that the axis 69 of the electromagnetic field created upon energization of the stator winding means (not shown) is substantially centered with respect to pole pieces 67, 68. However, the cylindrical form of rotor 70 is modified by providing recess portions 71, 72 that are diametrically opposed and equal in length. Rotor 70 is permanently magnetized with the axis of the permanent magnet field extending through the center of rotation 76 at the center of rotor 70 at points where recess 72 is connected to crown 74 and recess 71 is connected to crown 73. Thus, with the stator winding de-energized, the reluctance alignment position for axis 75 of the permanent field is offset in a clockwise direction from axis 69 of the electromagnetic field. This same effect is achieved, although to a lesser extent, so long as the permanent magnet axis 75 does not extend through the center of recesses 71, 72 or the center of crowns 73, 74.

FIGURES 7 and 8 show modified construction for a permanent magnet rotor to achieve the same effect that is achieved by rotor 70 of FIGURE 6. Rotor 80 of FIGURE 7 is a cylinder modified by having equal and symmetrically positioned side portions removed to produce parallel sides 81, 82 joining arcuate sides 83, 84. Rotor 80 is magnetized so that the permanent magnet axis 85 extends through the center of rotation 86 for rotor 80 and also extends through the boundary regions joining walls 81 to 84 and 82 to 83. Here again the important thing is that the permanent magnet axis 85 must extend through center of rotation 86 but must not extend through the centers of walls 81, 82 or the centers of walls 83, 84.

Rotor 90 of FIGURE 8 is of modified cylindrical form similar to rotor 80 except that in rotor 90 the cutaway portions 91, 92 are only half as extensive as the cutaway portions of rotor 80. Axis 93 of the permanent magnet field extends through center of rotation 94 as well as through the boundary portions between removed section 91 and arcuate wall 95, as well as the boundary portion between removed section 92 and arcuate wall 96. A further modification may be made by extending the boundary of removed portion 91 to include the portion outboard of dashed line 97 and extending removed portion 92 to include the area outboard of dashed line 98.

Thus, it is seen that the instant invention provides constructions for a brushless D.C. motor with novel means for achieving self-starting even though the basic switching means for achieving sequential current reversals in the stator windings is simplified. Further, certain embodiments of the self-starting feature include means whereby there will not be a sacrifice of starting torque when motor operation is reversed.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A brushless D.C. motor including a permanently magnetized rotor means producing a resultant permanent magnet flux field having a first axis, a shaft to which said rotor means is mounted for continuous rotation, a stator including magnetic frame means and winding means, said frame means including diametrically opposed pole pieces positioned with said rotor means therebetween, said winding means mounted to said magnetic frame means and when energized producing an electromagnetic flux field having a second axis, both of said axes extending through said shaft, a solid state switching means connected to said winding means for switching current flow therein responsive to angular positions of said rotor whereby said flux fields coact to produce motor action, magnetic reluctance means coacting with said motor means for positioning said first axis angularly displaced from said second axis when said winding means is de-energized whereby said motor is self-starting upon energization of said winding means said magnetic reluctance means including a magnetic means, mounting means supporting said magnetic means for adjustment relative to said magnetic frame whereby with said winding means de-energized said first axis is selectively positionable clockwise and counterclockwise of said second axis.

2. A motor as set forth in claim 1 in which said mounting means supports the magnetic means for angular movement about said shaft as a center.

3. A brushless D.C. motor including a permanently magnetized rotor means producing a resultant permanent magnet flux field having a first axis, a shaft to which said rotor means is mounted for continuous rotation, a stator including magnetic frame means and winding means, said frame means including diametrically opposed pole pieces positioned with said rotor means therebetween, said winding means mounted to said magnetic frame means and when energized producing an electromagnetic flux field having a second axis, both of said axes extending through said shaft, a solid state switching means connected to said winding means for switching current flow therein responsive to angular positions of said rotor whereby said flux fields coact to produce motor action, magnetic reluctance means coacting with said rotor means for positioning said first axis angularly displaced from said second axis when said winding means is de-energized whereby said motor is self-starting upon energization of said winding means, said magnetic reluctance means including said pole pieces each of which include a main section and symmetrically disposed first and second projections extending generally radially toward said rotor means, said first axis extending between said first and second projections when said winding means is de-energized, said winding means including main winding means coupled to said main section, first auxiliary winding means coupled to said first projections and second auxiliary winding means coupled to said second projections, said first and said second auxiliary winding means selectively connectable for energization together with said main winding whereby said second axis is selectively shiftable to positions clockwise and counterclockwise of the position occupied by said first axis when said winding means is de-energized.

4. A brushless D.C. motor including a permanently magnetized rotor means producing a resultant permanent magnet flux field having a first axis, a shaft to which said rotor means is mounted for continuous rotation, a stator including magnetic frame means and winding means, said frame means including diametrically opposed pole pieces positioned with said rotor means therebetween, said winding means mounted to said magnetic frame means and when energized producing an electromagnetic flux field having a second axis, both of said axes extending through said shaft, a rotor position sensing means for providing a high level sensor output signal during one-half of a rotor revolution and a low level sensor output signal during the other half of a rotor revolution, said sensing means being arranged to switch from one level output signal to the other whenever said first and second axes become aligned, a solid state switching means responsive to the output signal from said sensing means and connected to said winding means for switching current flow therein, said switching means providing current to said winding means so as to establish an electromagnetic flux field in one direction along said second axis during the occurrence of a high level sensor output signal and to establish an electromagnetic flux field in the opposite direction in response to a low level sensor output signal, magnetic reluctance means coacting with said rotor means for positioning said first axis angularly displaced from said second axis when said winding means is de-energized whereby said motor is self-starting upon energization of said winding means.

References Cited

UNITED STATES PATENTS

| | | | |
|---|---|---|---|
| 1,976,880 | 10/1934 | Greasby | 310—164 |
| 2,227,894 | 1/1941 | Elms | 310—164 |
| 2,250,395 | 7/1941 | Russell | 310—164 |
| 3,032,670 | 5/1962 | Fritz | 310—164 |
| 3,164,734 | 1/1965 | Heinzen | 310—162 XR |
| 3,264,538 | 8/1966 | Brailsford | 313—254 XR |
| 3,359,474 | 12/1967 | Welch et al. | 318—254 XR |

GLEN R. SIMMONS, Primary Examiner

U.S. Cl. X.R.

310—41, 190